US006809894B2

(12) United States Patent
Bliss et al.

(10) Patent No.: US 6,809,894 B2
(45) Date of Patent: Oct. 26, 2004

(54) METHOD AND APPARATUS FOR HANDLING END OF DATA PROCESSING IN A DATA STORAGE DEVICE

(75) Inventors: William G. Bliss, Thornton, CO (US); Razmik Karabed, San Jose, CA (US); James W. Rae, Rochester, MN (US); Heiner Stockmanns, Santa Cruz, CA (US); Kaichi Zhang, Santa Cruz, CA (US)

(73) Assignee: Infineon Technologies AG, Munich (DE)

(*) Notice: Subject to any disclaimer, the term of this patent is extended or adjusted under 35 U.S.C. 154(b) by 248 days.

(21) Appl. No.: 09/896,135

(22) Filed: Jun. 29, 2001

(65) Prior Publication Data

US 2003/0002188 A1 Jan. 2, 2003

(51) Int. Cl.[7] .................................................. G11B 5/09
(52) U.S. Cl. .............................. 360/48; 360/46; 360/65
(58) Field of Search ........................... 360/40, 48, 46, 360/65

(56) References Cited

U.S. PATENT DOCUMENTS

| | | | | |
|---|---|---|---|---|
| 5,343,455 A | * | 8/1994 | Takeuchi et al. | 369/59.26 |
| 5,757,822 A | * | 5/1998 | Fisher et al. | 360/40 |
| 6,148,431 A | | 11/2000 | Lee et al. | |
| 6,199,191 B1 | | 3/2001 | Iwata | |
| 6,219,387 B1 | | 4/2001 | Glover | |
| 6,366,418 B1 | * | 4/2002 | McEwen et al. | 360/48 |
| 6,392,830 B1 | * | 5/2002 | Malone, Sr. | 360/48 |
| 6,417,788 B1 | * | 7/2002 | McEwen et al. | 360/40 |
| 6,539,514 B1 | * | 3/2003 | Bartlett | 360/48 |

OTHER PUBLICATIONS

"Exact Bounds for Viterbi Detector Path Metric Differences," Paul H. Siegel, C. Bernard Shung, Thomas D. Howell, Hermant K. Thapar, IBM Corporation, San Jose, CA.
"A 100MBIT/S Viterbi Decoder Chip: Novel Architecture and its Realization," Gerhard Fettweis, Heinrich Meyr, ICC'90, paper No. 257, session 307A, Atlanta GA, USA, Apr. 16–19, 1990.
"Where do we use Viterbi Decoder?" Opencores.org.
"A Tutorial on Convolutional Coding with Viterbi Decoding," Chip Fleming, Spectrum Applications, 1999, http://pwl.netcom.com/~chip.f/viterbi/tutorial.html.
"PRML: Seagate Uses Space Age Technology Today," http://www.seagate.com/support/kb/disc/prml.html.
"PRML," http://www.idema.org/about/industry/ind_tech_prml.html.

(List continued on next page.)

*Primary Examiner*—David Hudspeth
*Assistant Examiner*—Rocio Colon
(74) *Attorney, Agent, or Firm*—Brinks Hofer Gilson & Lione

(57) ABSTRACT

A method and apparatus for handling end of data processing in a data storage device. The method includes receiving a plurality of user data bits at a write channel. The method further includes appending primary padding bits to user data bits if the plurality of user data bits is less than a multiple of an input block length of an encoder in the write channel and encoding the plurality of user data bits and any primary padding bits into a plurality of encoded data bytes. Additionally, the method includes appending an end of data marker to an end of the plurality of encoded data bytes, wherein the end of data marker has a length of no more than one byte, and writing the plurality of encoded data bytes and the end of data marker to the data store.

12 Claims, 3 Drawing Sheets

OTHER PUBLICATIONS

"Hard Disc Data Encoding and Decoding," http://www.storagereview.com/guide2000/ref/hdd/geom/data.html.

"Technical Requirments for Encoding and Decoding," http://www.storagereview.com/guide2000/ref/hdd/geom/dataRequirements.html.

"Run Length Limited (RLL)," http://www.storagereview.com/guide2000/ref/hdd/geom/dataRLL.html.

"Partial Response, Maximum Likelihood (PRML)," http://www.storagereview.com/guide2000/ref/hdd/geom/dataPRML.html.

"Extended PRML (EPRML)," http://www.storagereview.com/guide2000/ref/hdd/geom/dataEPRML.html.

"MR and PRML: Technologies in Synergy—How Advanced Head and Read Channel Technologies Work Together to Increase Capacity and Improve Performance of Desktop Drives—A Quantum White Paper," http://www.lionsgate.com/Home/baden/public_html_index/SCSI/Quantum_WhitePapers/MR Head/MR4/9/01.

"Westerm Digital Corporation—Glossary, Viterbi Detection," http://www.westerndigital.com/company/glossary.html.

"Description of the Algorithms (Part 1)," http://pwl.netcom.com/~chip.f/viterbi/algrthms.html.

"Synchronous Recording Channels—PRML," KnowledgeTek, Inc., 1999.

"A CMOS Continuous—Time Gm–C Filter for PRML Read Channel Applications at 150 Mb/s and Beyond," Iuri Mehr, David R. Welland, IEEE Journal of Solid State Circuits, vol. 32, No. 4, Apr. 1997.

* cited by examiner

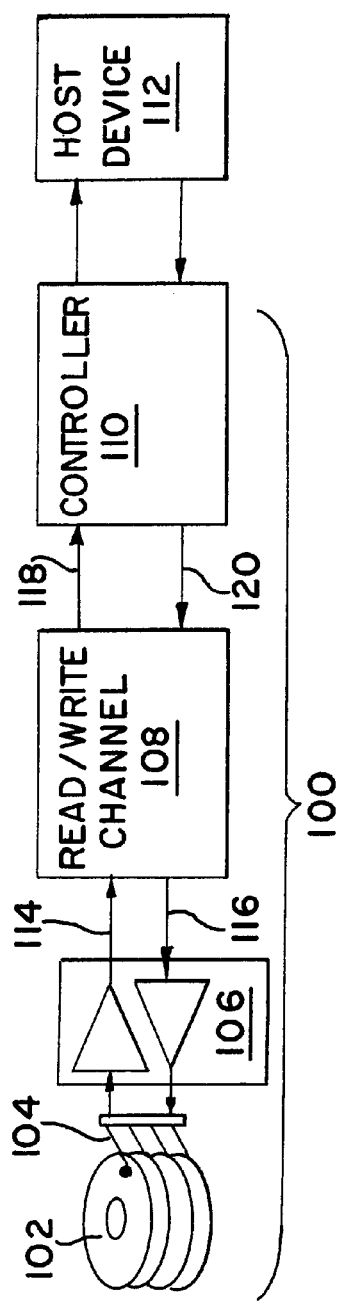
FIG. IA

METHOD AND APPARATUS FOR HANDLING END OF DATA PROCESSING IN A DATA STORAGE DEVICE

BACKGROUND

Computer hard disk drives, also known as fixed disk drives or hard drives, have become a de facto standard data storage component of modern computer systems and are making farther inroads into modern consumer electronics as well. Their proliferation can be directly attributed to their low cost, high storage capacity and high reliability, in addition to wide availability, low power consumption, high data transfer speeds and decreasing physical size.

These disk drives typically consist of one or more rotating magnetic platters encased within an environmentally controlled housing that further includes all of the electronics and mechanics to read and write data and interface with other devices. Read/write heads are positioned above each of the platters, and typically on each face, to record and read data. The electronics of a hard disk drive are coupled with these read/write heads and include numerous components to control the position of the heads and generate or sense the electromagnetic fields representing data. These components receive data from a host device, such as a personal computer, and translate that data into magnetic encodings written onto the disk platters by the heads. Further, when a host device requests data from the drive, the electronics locate the desired data, sense the magnetic encodings which represent that data and translate those encodings back into the binary digital information which the host device can understand. Further, error detection and correction algorithms are applied to ensure accurate storage and retrieval of data.

One area in which significant advancements have been made has been in the area of read/write head technology and the methods of interpreting the magnetic fluctuations sensed by these heads. The read/write head, of which a typical hard disk has several, is the interface between magnetic platters and the disk drive electronics. The read/write head actually reads and writes the magnetically encoded data as areas of magnetic flux on the platters. Data, consisting of binary 1's and 0's, are encoded by sequences of the presence or absence of flux reversals recorded or detected by the read/write head. A flux reversal is a change in the magnetic flux in two contiguous areas of the disk platter. Traditional hard drives read data off the platters by detecting the voltage peak imparted in the read/write head when a flux reversal passes underneath the read/write head as the platters rotate. This is known as "peak detection." However, increasing storage densities require reduced peak amplitudes and better signal discrimination and higher platter rotational speeds are pushing the peaks closer together thus making peak detection more difficult to accomplish.

Magneto-resistive ("MR") read/write heads have been developed with increased sensitivity to sense smaller amplitude magnetic signals and with increased signal discrimination to address some of the problems with increasing storage densities. In addition, another technology, known as Partial Response Maximum Likelihood ("PRML"), has been developed to further address the problems with peak detection as densities and rotational speeds increase. Borrowed from communications technology, PRML is an algorithm implemented in the disk drive electronics to interpret the magnetic signals sensed by the read/write heads. PRML-based disk drives read the analog waveforms generated by the magnetic flux reversals stored on the disk. However, instead of looking for peak values to indicate flux reversals, PRML-based drives digitally sample this analog waveform (the "Partial Response") and use advanced signal processing technologies to determine the bit pattern represented by that wave form (the "Maximum Likelihood"). This technology, in conjunction magneto-resistive ("MR") heads, have permitted manufacturers to further increase data storage densities. PRML technology further tolerates more noise in the sensed magnetic signals permitting the use of lower quality platters and read/write heads which increases manufacturing yields and lowers costs.

With many different drives available from multiple manufacturers, hard disk drives are typically differentiated by factors such as cost/megabyte of storage, data transfer rate, power requirements and form factor (physical dimensions) with the bulk of competition based on cost. With most competition between hard disk drive manufacturers coming in the area of cost, there is a need for enhanced hard disk drive components which prove cost effective in increasing supplies and driving down manufacturing costs all while increasing storage capacity, operating speed, reliability and power efficiency.

SUMMARY

The present invention is defined by the following claims, and nothing in this section should be taken as a limitation on those claims. By way of introduction, the preferred embodiments described below relate to a method of processing an end of data condition for data in a data storage and retrieval system, the data storage and retrieval system having a write channel and a read channel and a data store. The method includes receiving a plurality of user data bits at the write channel. The method further includes appending primary padding bits to the user data bits if the plurality of user data bits is less than a multiple of an input block length of an encoder in the write channel and encoding the plurality of user data bits and any primary padding bits into a plurality of encoded data bytes. Additionally, the method includes appending an end of data marker to an end of the plurality of encoded data bytes, wherein the end of data marker has a length of no more than one byte, and writing the plurality of encoded data bytes and the end of data marker to the data store.

The preferred embodiments further relate to a read/write channel for a hard disk drive. The reads/write channel includes a write channel and a read channel. The write channel receives a plurality of user data bits from a controller and includes an encoder and a marker generator. The encoder encodes the plurality of user data bits into a plurality of encoded data bytes, and the marker generator generates an end of data marker at the end of the plurality of encoded data bytes. Preferably, the end of data marker has a length of no more than one byte. The read channel receives the plurality of encoded data bytes and the end of data marker from a data store. The read channel includes a Viterbi detector for processing the plurality of encoded data bytes in the read channel. The Viterbi detector has an end of data mode which places the Viterbi detector in a predetermined state where information in a path memory of the Viterbi detector is changed to a desired value. The Viterbi enters the end of data mode upon receiving the data marker. Further aspects and advantages of the invention are discussed below in conjunction with the preferred embodiments.

BRIEF DESCRIPTION OF THE DRAWINGS

FIG. 1A depicts a block diagram of an exemplary hard disk drive coupled with a host device.

DETAILED DESCRIPTION OF THE PRESENTLY PREFERRED EMBODIMENTS

Figure 1B:
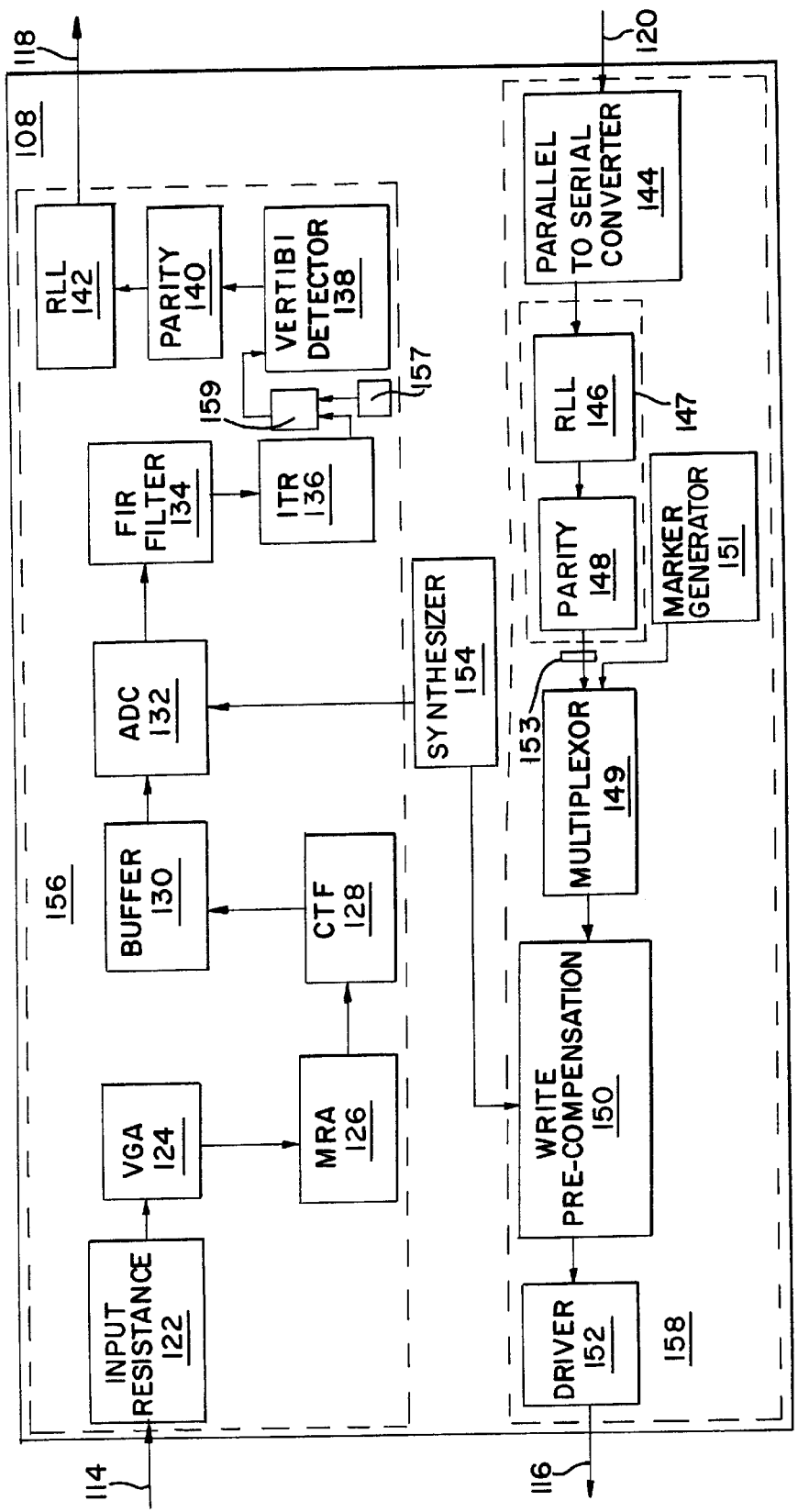
FIG. 1B depicts a block diagram of a read/write channel for use with the hard disk drive of FIG. 1A.

The embodiments described herein relate to a PRML-based read/write channel device for hard disk drive controllers. More specifically, described below is a method and apparatus for reducing read channel noise problems that may arise when processing the end of an encoded user data byte stream read off of a data store, such as a hard disk drive. The read/write channel is a device coupled with the read/write heads of the hard disk drive. Herein, the phrase "coupled with" is defined to mean directly connected to or indirectly connected with through one or more intermediate components. Such intermediate components may include both hardware and software based components. The read/write channel converts the encoded user data which is in binary/digital form from the host device into the electrical impulses which drive the read/write head to magnetically record the encoded user data to the disk drive platters. Further, the read/write channel receives the encoded user data in analog form from the read/write heads and converts the encoded user data from analog form back into binary/digital form.

As described in more detail, a Viterbi detector is a maximum likelihood detector or Viterbi decoder implementing the Viterbi algorithm for analyzing the encoded user data which is read off the hard disk drive, which helps generate the binary/digital data that is stored on the hard disk drive. In performing maximum likelihood detection, the Viterbi algorithm provides an iterative method for determining the best path along branches of a trellis diagram. The maximum likelihood detection involves analyzing a number of consecutive bits of encoded user data to determine the most likely path. Thus, by analyzing a number of consecutive bits of encoded user data, the most likely sequence can be chosen. An example of one implementation of a Viterbi detector is described in greater detail in a paper entitled "A 100 MBIT/S Viterbi Detector Chip: Novel Architecture And Its Realization," written by Gerhard Fettweis and Heinrich Meyr, presented to the ICC in 1990, in Atlanta, Ga., on Apr. 16–19, 1990, given paper no. 257, at session 307A, the entire disclosure of which is incorporated herein by reference.

It is desired that Viterbi decisions on the encoded user data bits not to be influenced by any noise entering the read/write channel after the end of the encoded user data, or the end of the sector, is reached. Thus, in order for Viterbi decisions made by the Viterbi detector on the encoded user bits not to be influenced by any noise entering the read/write channel after the end of the user data, the bit length of the user data is extended by padding the encoded user data with secondary padding bits (PAD2), as described below.

Typically, the length of secondary padding bits (PAD2), in bits, must be no less than the sum of the path memory length and any filtering delays, not counting any pipelining delays. The path memory length K is to be chosen such that the probability is maximized that all paths to all states considered by the Viterbi detector in the current time step emerged or passed through the very same state K time steps in the past. The filtering delays are the total number of non-causal output data samples of an analog to digital converter ("ADC") which are considered in the filter operations performed by a finite impulse response ("FIR") filter and an interpolated timing recovery ("ITR") circuit in order to compute input data presented to the Viterbi detector. The pipelining delays are any delays introduced to distribute computation in time which are not inherent to the algorithm performed. The second set of padding bits (PAD2) are denoted by $Q(1), Q(2), \ldots, Q(L2)$, wherein L2 represents the amount of secondary padding bits added. Secondary padding bits $Q(j)$ which are added, wherein $1 < j \leq L2$, can be arbitrary. Now user data bits $U(1), U(2), U(3), \ldots, U(N)$, primary padding bits $P(1), \ldots, P(L1)$, and secondary padding bits $Q(1), \ldots, Q(L2)$, are all then sent to the channel for processing.

For some types of Viterbi detectors the length of secondary padding bits (PAD2), in bits, can be quite long, such as for example up to 100 bits long. Since the secondary padding bits (PAD2), are at one time stored on the hard disk drive, the secondary padding bits (PAD2) can occupy quite a bit of space on the hard drive. Therefore, it is desirable to reduce the amount of space occupied on the hard disk drive by the secondary padding bits (PAD2).

Referring to FIG. 1A, there is shown a block diagram of an exemplary hard disk drive 100 coupled with a host device 112. For clarity, some components, such as the servo/actuator motor control, are not shown. The drive 100 includes the magnetic platters and spindle motor 102, the read/write heads and actuator assembly 104, pre-amplifiers 106, a read/write channel 108 and a controller 110. The pre-amplifiers 106 are coupled with the read/write channel 108 via interfaces 114, 116. The controller 110 interfaces with the read/write channel 108 via interfaces 118, 120.

For reads from the hard disk 100, the host device 112 provides a location identifier which identifies the location of the data on the disk drive, e.g. a cylinder and sector address. The controller 110 receives this address and determines the physical location of the data on the platters 102. The controller 110 then moves the read/write heads into the proper position for the data to spin underneath the read/write heads 104. As the data spins underneath the read/write head 104, the read/write head 104 senses the presence or absence of flux reversals, generating a stream of analog signal data. This data is passed to the pre-amplifiers 106 which amplifies the signal and passes it to the read/write channel 108 via the interface 114. As will be discussed below, the read/write channel receives the amplified analog waveform from the pre-amplifiers 106 and decodes this waveform into the digital binary data that it represents. This digital binary data is then passed to the controller 110 via the interface 118. The controller 110 interfaces the hard drive 100 with the host device 112 and may contain additional functionality, such as caching or error detection/correction functionality, intended to increase the operating speed and/or reliability of the hard drive 100.

For write operations, the host device 112 provides the controller 110 with the binary digital data to be written and the location, e.g. cylinder and sector address, of where to write it. The controller 110 moves the read/write heads 104 to the proper location and sends the binary digital data to be written to the read/write channel 108 via interface 120. The read/write channel 108 receives the binary digital data, encodes it and generates analog signals which are used to drive the read/write head 104 to impart the proper magnetic flux reversals onto the magnetic platters 102 representing the binary digital data. The generated signals are passed to the pre-amplifiers 106 via interface 116 which drive the read/write heads 104.

Referring to FIG. 1B, there is shown an exemplary read/write channel 108 supporting Partial Response Maximum Likelihood ("PRML") encoding technology for use with the hard disk drive 100 of FIG. 1A. For clarity, some components have been omitted. The read/write channel 108 is implemented as an integrated circuit using a complementary metal oxide semiconductor ("CMOS") process at 0.18 micron. It will be appreciated that CMOS processes include processes which use metal gates as well as polysilicon gates. It will further be appreciated that other process technologies and feature sizes may used and that the circuitry disclosed herein may be further integrated with other circuitry comprising the hard disk electronics such as the hard disk controller logic. As was described, the read/write channel 108 converts between binary digital information and the analog signals representing the magnetic flux on the platters 102. The read/write channel 108 is divided into two main sections, the read channel 156 and the write channel 158.

The write channel 158 includes a parallel-to-serial converter 144, an encoder 147, a write pre-compensation circuit 150 and a driver circuit 152. The parallel-to-serial converter 144 receives user data from the host device 112 via interface 120 eight bits at a time. Preferably, the user data received from the host device 112 has already been padded with primary padding bits (PAD1), as described in greater detail below. The primary padding bits (PAD1) comprise dummy bits which are inserted at the end of the user data bits so that the length in bits of the user data is always a multiple of the of the input block length to the encoder 147. The input block length to the encoder 147 is the number of bits the encoder needs to properly process the user data. Thus, if the input block length to the encoder 147 is 32 bits, the encoder needs to receive the user data in 32 bit blocks in order to properly process the user data. Therefore, if the user data is 100 bits long, and the input block length to the encoder 147 is 32 bits, 28 primary padding bits (PAD1) are inserted at the end of the user data to insure that the length in bits of the user data is a multiple of 32, that is 32*4=128=100+28. Once the user data is received by the converter 144, the converter 144 serializes the input data and sends the serial bit stream to the encoder 147.

Figure 2:
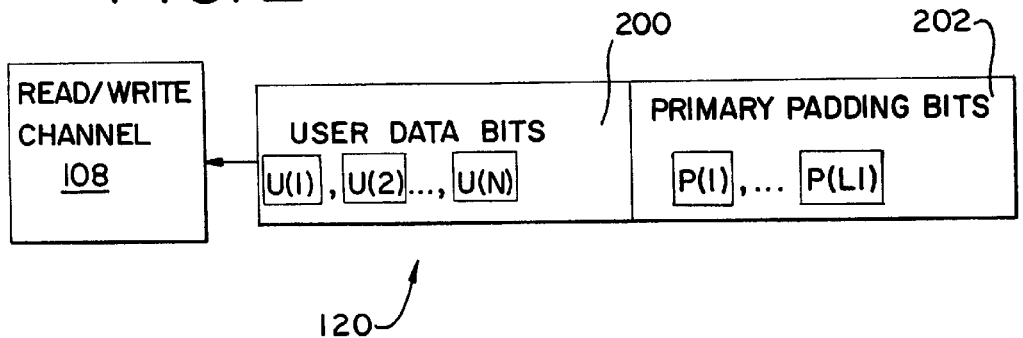
FIG. 2 depicts the interface which connects a controller with the read/write channel of FIG. 1B.
Figure 3:
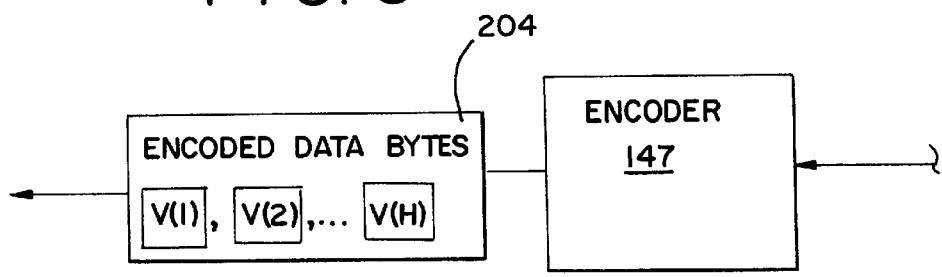
FIG. 3 depicts encoded data bytes output from an encoder of the read/write channel of FIG. 1B.
Figure 4:
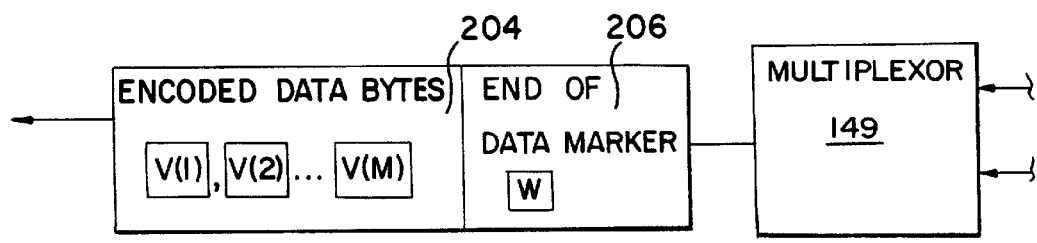
FIG. 4 depicts encoded data bytes and an end of data marker output from a multiplexor of the read/write channel of FIG. 1B.

The encoder 147 takes user data bits 200 U(1), U(2), U(3), ..., U(N), having primary padding bits 202 P(1), ..., P(L1), and then codes the user data bits 200 and the primary padding bits 202 into encoded data bytes 204 V(1), V(2), V(3), ..., V(M), as illustrated in FIGS. 1B, 2, and 3. In one embodiment, the encoded data bytes 204 (V) are 34 bits long, wherein M=(N+L1)/4. The encoder 147 comprises a run-length-limited ("RLL") encoder 146 and a parity encoder 148. The RLL encoder 146 encodes the user data bits 200 and the primary padding bits 202 into symbolic binary sequences according to a known run-length limited algorithm for recording on the platters 102. The exemplary RLL encoder uses a 32/33 bit symbol code to ensure that flux reversals are properly spaced and that long runs of data without flux reversals are not recorded. The RLL encoded user data bits 200 and the primary padding bits 202 are then passed to the parity encoder 148 which adds a parity bit to the data. In the exemplary parity encoder 148, odd parity is used to ensure that long run's of 0's and 1's are not recorded due to the magnetic properties of such recorded data. The encoded data bytes 204 are subsequently treated as an analog signal rather than a digital signal. The analog signal is then passed through a multiplexor 149, as illustrated in FIG. 1B. When the end of the encoded data bytes 204 is reached, the multiplexor 149 switches its input from the output of the parity encoder 148 to the output of the marker generator 151, and the marker generator 151 generates an end of data marker 206 (W) which is then added to the end of the encoded data bytes 204, as discussed in more detail below. It is the task of the controller 110 to signal the end of user data. This might be done by either providing the number of user bytes such that the end of user data can be identified by counting or via a signal usually called the WRITE GATE. If signaling relies on the WRITE GATE, this signal must be timed by the controller 110 such that the channel 108 can perform any synchronization required to identify the end of data event with respect to the sequence of data to be written. In one preferred embodiment, the end of data marker 206 is represented by a series of zero bits, and even more preferably, by at least four zero bits. Preferably, these four zero bits are augmented by some more bits such that the total number of bits matches any filtering delays such as those filtering delays introduced by an FIR filter 134 and an ITR circuit 136, as discussed in more detail below. In one preferred embodiment, the marker generator 151 hardcodes (NRZ) a data marker 206 of one byte after the encoded data bytes 204. The data marker 206 is programmable. Preferably, the data marker 206 is made up of eight data marker bits (w1 w2 w3 w4 w5 w6 w7 w8). In one embodiment, we set the eight data marker bits to zero, so that: (w1 w2 w3 w4 w5 w6 w7 w8)=(0 0 0 0 0 0 0 0).

In one preferred embodiment, the analog signal passes from the parity encoder 148 through a pre-coder 153 before passing through the multiplexor 149, as illustrated in FIG. 1B. The pre-coder 153 ensures that the timing information contained in the encoded data bytes 204 is preserved in a way such that reliable timing recovery is possible when reading back the encoded data bytes 204 from the hard disk drive platters 102. The pre-coder 153 outputs pre-coded data bytes (VP) which are then sent to the multiplexor 149.

The analog signal is then passed from the multiplexor 149 to a write pre-compensation circuit 150 which dynamically adjusts the pulse widths of the bit stream to account for magnetic distortions in the recording process. The adjusted analog signal is passed to a driver circuit 152 which drives the signal to the pre-amplifiers 106 via interface 116 to drive the read/write heads 104 and record the data. The exemplary driver circuit 152 includes a pseudo emitter coupled logic ("PECL") driver circuit which generates a differential output to the pre-amplifiers 106.

The read channel 156 includes an attenuation circuit/input resistance 122, a variable gain amplifier ("VGA") 124, a magneto-resistive asymmetry linearizer ("MRA") 126, a continuous time filter ("CTF") 128, a buffer 130, an analog to digital converter ("ADC") 132, a finite impulse response ("FIR") filter 134, an interpolated timing recovery ("ITR") circuit 136, a Viterbi algorithm detector 138, a parity decoder 140 and a run-length-limited ("RLL") decoder 142. The amplified magnetic signals sensed from the platters 102 by the read/write head 104 are received by the read/write channel 108 via interface 114. The analog signal waveform representing the sensed magnetic signals is first passed through an input resistance 122 which is a switching circuit to attenuate the signal and account for any input resistance. The attenuated signal is then passed to a VGA 124 which amplifies the signal. The amplified signal is then passed to the MRA 126 which adjusts the signal for any distortion created by the recording process. Essentially, the MRA 126 performs the opposite function of the write-pre-compensation circuit 150 in the write channel 158. The signal is next passed through the CTF 128, which is essentially a low pass filter, to filter out noise. The filtered signal is then passed to the ADC 132 via the buffer 130 which samples the analog signal and converts it to a digital form.

The digital signal is then passed to a FIR filter 134 and then to a timing recovery circuit 136. The timing recovery circuit 136 is connected (not shown in the figure) to the FIR filter 134, the MRA 126 and the VGA 124 in a feedback orientation to adjust these circuits according to the signals received to provide timing compensation. The exemplary FIR filter 134 is a 10 tap FIR filter. The digital signal is then passed to the Viterbi algorithm detector 138 which determines the binary bit pattern represented by the digital signal using digital signal processing techniques. The Viterbi detector 138 has states with a predetermined memory length. The exemplary Viterbi algorithm detector 138 uses a 32 state Viterbi processor, wherein each state has a predetermined memory length of 4 bits.

The Viterbi detector 138 then receives an end of data signal from the controller 110 (not illustrated), when the end of the user data is reached, to signal to the Viterbi detector 138 that the end of the user data has been reached. Alternatively, a signal from a counter (not shown), or a read gate signal from the controller 110, can also signal to the Viterbi detector 138 that the end of the user data has been reached. When the counter (not shown) is used, the read/write channel 108 must be given the length of the sector. But when the read gate signal is used, it is assumed the read gate signal will drop in a known byte location (W). If the read gate signal drops prior to the Viterbi detector 108 receiving the data marker (W), then the Viterbi detector 108 needs to wait until the Viterbi detector 108 receives the data marker (W) before entering an end of data transfer (EDT) mode. However, if the read gate signal drops after the Viterbi detector 138 receives the data marker (W), then the Viterbi detector 108 may enter the EDT mode immediately.

Once the Viterbi detector 138 receives the end of data signal, the Viterbi detector 138 awaits the receipt of the data marker (W). Upon receiving the data marker (W), the Viterbi detector 138 enters an end of data transfer (EDT) mode. Upon entering the EDT mode, the samples of encoded user data entering the Viterbi detector 138 will be replaced with secondary padding bits, preferably equal to 0. The secondary padding bits, preferably equal to 0, will be input into the Viterbi detector 138 until all the encoded user data is flushed out of the Viterbi detector 138.

In one embodiment, the end of data marker 206 is made up of eight marker data bits (w1 w2 w3 w4 w5 w6 w7 w8). In one embodiment, we set the eight data marker bits to zero, so that: (w1 w2 w3 w4 w5 w6 w7 w8)=(0 0 0 0 0 0 0 0). If the Viterbi detector 138 has a predetermined memory length of 4 bits, the fourth data marker bit (w4) will force the correct path in the trellis within the Viterbi detector 138 to end in a state s=[p s1 s2 s3 s4]=[0 0 0 0 0], where s1, s2, s3, and s4 are NRZ values, wherein s1 is the current value, and wherein p is state parity information. The remaining data marker bits, w5–w8, will keep the correct path in state s=[0 0 0 0 0]. After receiving the fourth data marker bit (w4), the Viterbi detector 138 will go into the end of data transfer (EDT) mode. If a read gate signal from the controller 100 is used, and if the read gate signal drops prior to the Viterbi detector 108 receiving the fourth data marker bit (w4), then the Viterbi detector 138 needs to wait for the fourth data marker bit (w4) before entering the EDT mode. However, if the READ GATE drops after the Viterbi detector 108 receiving the fourth data marker bit (w4), then the Viterbi detector 138 enters the EDT mode immediately. If the EDT mode is signaled by a counter, then the end of data marker 206 can have length which is equal to the predetermined memory length of the Viterbi detector 138. For example, if the Viterbi detector 138 has a predetermined memory length of 4 bits, the end of data marker 206 can have a length of 4 bits, which is preferably augmented by as many bits as required to account for any filtering delays, as described above. In the present implementation, a survivor corresponding to state s=[0 0 0 0 0] will be output from the Viterbi detector 138. Using the above described method, the Viterbi will be protected from any large noise which might enter the read/write channel 108 after the last user encoded data bytes have been received by the Viterbi detector 138.

In one embodiment, a padding generator 157 generates the secondary padding bits which are then passed to a multiplexor 159, as illustrated in FIG. 1B. Multiplexor 159 receives both the output from the ITR 136 and the padding generator 157. The output from the ITR 136 is allowed to pass through the multiplexor 159 until the Viterbi detector 138 enters the end of data transfer (EDT) mode, upon which the multiplexor then selects to receive the secondary padding bits generated by the padding generator 157. While the above embodiments use a padding generator 157 to generate the secondary padding bits, secondary padding bits may be generated by the Viterbi detector 138, or by any other circuitry known to those skilled in the art.

In one embodiment, the Viterbi detector 138 may be configured to internally generate a stream of signals, such as logical zeros, to maintain the desired state in the Viterbi detector 138 and to prevent any large noise which might enter the read/write channel 108 after the last user encoded data bytes have been received by the Viterbi detector 138.

The binary data represented by the digital signal exiting the Viterbi detector 138 is then passed to the parity decoder 140 which removes the parity bit and then to the RLL decoder 142 which decodes the binary RLL encoding symbols back into the actual binary data that they represents This data is then passed to the controller 110 via the interface 118.

The read/write channel 108 further includes a clock synthesizer 154. The clock synthesizer 154 generates the clock signals required for operating the read/write channel 108. The exemplary clock synthesizer 154 includes a phased lock look ("PLL") (not shown) with a voltage controlled oscillator and various clock dividers to generate the necessary frequencies.

It is to be noted that suitable transistor sizes specifying channel width-to-length ratios (measured in micrometers or microns) for the transistors which make up the depicted circuits have been omitted from the figures. It will be appreciated that suitable ratios may be chosen depending on the design requirements and the capabilities and limitations of the particular integrated circuit fabrication process used for implementation of the circuit as well as the performance requirements of the specific embodiment.

Thus, there has been disclosed in accordance with the invention, a method for Viterbi detector state metric re-normalization for a Viterbi detector of a read/write channel for a hard disk drive that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

We claim:

1. A method of processing an end of data condition for data in a data storage and retrieval system, the data storage and retrieval system having a write channel and a read channel and a data store, the method comprising:
   receiving a plurality of user data bits at the write channel;
   appending primary padding bits to the user data bits if the plurality of user data bits is less than a multiple of an input block length of an encoder in the write channel;
   encoding the plurality of user data bits and any primary padding bits into a plurality of encoded data bytes;
   appending an end of data marker to an end of the plurality of encoded data bytes, wherein the end of data marker has a length less than or equal to one byte; and
   writing the plurality of encoded data bytes and the end of data marker to the data store.

2. The method of claim 1, wherein the appending of the end of data marker comprises appending an end of data marker having a bit length no less than a bit length of a predetermined memory length of a state for a Viterbi detector in the read channel of the data storage and retrieval system.

3. The method of claim 1, wherein appending an end of data marker comprises appending an end of data marker having a bit length equal to a bit length of a predetermined memory length of a state for a Viterbi detector in the read channel of the data storage and retrieval system.

4. The method of claim 1, wherein the end of data marker comprises data configured to trigger an end of data transfer mode in a Viterbi detector in the read channel.

5. The method of claim 1, further comprising:
   reading the plurality of encoded data bytes and the end of data marker from the data store and providing the plurality of encoded data bytes and the end of data marker to an input of a Viterbi detector in the read channel;
   processing the plurality of encoded data bytes in the Viterbi detector; and
   identifying the end of data marker at the Viterbi detector wherein the end of data marker triggers an end of data mode in the Viterbi detector, the end of data mode comprising:
      placing the Viterbi detector in a predetermined state where information in a path memory of the Viterbi detector is changed to a desired value; and
      providing a predetermined input value to the input of the Viterbi detector until the Viterbi detector has completed processing all of the plurality of encoded data bytes, wherein read channel noise is prevented from entering the Viterbi detector after a last of the plurality of encoded data bytes is provided to the input.

6. A method of processing an end of data condition for data in a data storage and retrieval system, the data storage and retrieval system having a write channel and a read channel and a data store, the method comprising:
   reading a plurality of encoded data bytes and an end of data marker from the data store, the end of data marker comprising information to trigger an end of data mode in a Viterbi detector in the read channel;
   processing the plurality of encoded data bytes in the Viterbi detector in the read channel; and
   identifying the end of data marker at the Viterbi detector wherein the end of data marker triggers an end of data mode in the Viterbi detector, the end of data mode comprising:
      placing the Viterbi detector in a predetermined state where encoded data bytes entering the Viterbi detector are replaced with data bits generated by a padding generator coupled with the Viterbi detector, the data bits being set to a predetermined input value by the padding generator; and
      providing the data bits set to the predetermined input value to the Viterbi detector until the Viterbi detector has completed processing all of the plurality of encoded data bytes, wherein read channel noise is prevented from entering the Viterbi detector after a last of the plurality of encoded data bytes is provided to the Viterbi detector.

7. The method of claim 6, further comprising counting the plurality of encoded data bytes and sending a signal to the Viterbi detector when a last of the plurality of encoded data bytes has been input to the Viterbi detector, wherein the signal alerts the Viterbi detector to watch for the end of data marker.

8. The method of claim 6, wherein the end of data marker comprises a bit length no less than a bit length of a predetermined memory length of a state for the Viterbi detector.

9. The method of claim 8, wherein the end of data marker comprises a bit length equal to a multiple of the bit length of the predetermined memory length of the state for the Viterbi detector.

10. The method of claim 6 wherein the predetermined input value is a zero value.

11. A read/write channel for a hard disk drive, comprising:
    a write channel which receives a plurality of user data bits from a controller, the write channel comprising:
       an encoder which encodes the plurality of user data bits into a plurality of encoded data bytes; and
       a marker generator which generates an end of data marker at the end of the plurality of encoded data bytes, wherein the end of data marker has a length of no more than one byte; and
    a read channel which receives the plurality of encoded data bytes and the end of data marker from a data store, the read channel comprising a padding generator to generate data bits and a Viterbi detector, the Viterbi detector for processing the plurality of encoded data bytes in the read channel, wherein the Viterbi detector is operable in an end of data mode which places the Viterbi detector in a predetermined state where encoded data bytes entering the Viterbi detector are replaced with data bits set to a predetermined input value and the data bits are provided to the Viterbi detector by the padding generator until all encoded data bytes are flushed out of the Viterbi detector, and wherein the Viterbi detector enters the end of data mode upon receiving the end of data marker.

12. The read/write channel of claim 11 wherein the predetermined input value is a zero value.

* * * * *